United States Patent
Rogers et al.

(10) Patent No.: US 7,499,929 B2
(45) Date of Patent: Mar. 3, 2009

(54) COMPUTING DEVICE WITH RELATIVELY LIMITED STORAGE SPACE AND OPERATING/FILE SYSTEM THEREOF

(75) Inventors: Andrew Michael Rogers, Seattle, WA (US); Yadhu N. Gopalan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 11/001,158

(22) Filed: Dec. 1, 2004

(65) Prior Publication Data
US 2005/0210055 A1    Sep. 22, 2005

Related U.S. Application Data

(60) Provisional application No. 60/555,104, filed on Mar. 22, 2004, provisional application No. 60/555,392, filed on Mar. 22, 2004, provisional application No. 60/555,155, filed on Mar. 22, 2004, provisional application No. 60/555,102, filed on Mar. 22, 2004.

(51) Int. Cl.
*G06F 7/00*      (2006.01)

(52) U.S. Cl. ..................... 707/101; 707/205; 707/204; 709/217; 709/213

(58) Field of Classification Search ................ 707/101
See application file for complete search history.

(56) References Cited

U.S. PATENT DOCUMENTS

| | | | | |
|---|---|---|---|---|
| 5,530,850 A * | 6/1996 | Ford et al. | ................... | 707/206 |
| 5,819,298 A * | 10/1998 | Wong et al. | ................. | 707/205 |
| 6,032,160 A * | 2/2000 | Lehman | ..................... | 707/205 |
| 6,112,210 A * | 8/2000 | Nori et al. | ............... | 707/103 R |
| 6,151,602 A * | 11/2000 | Hejlsberg et al. | ............. | 707/10 |
| 6,467,021 B1 * | 10/2002 | Sinclair | ...................... | 711/113 |
| 6,658,437 B1 * | 12/2003 | Lehman | ..................... | 707/205 |
| 6,697,846 B1 * | 2/2004 | Soltis | ......................... | 709/217 |
| 7,020,664 B1 * | 3/2006 | Yamaguchi et al. | ......... | 707/200 |
| 2006/0015528 A1 * | 1/2006 | Hejlsberg et al. | ........ | 707/104.1 |
| 2006/0236064 A1 * | 10/2006 | Niles et al. | .................. | 711/170 |

\* cited by examiner

*Primary Examiner*—Don Wong
*Assistant Examiner*—Binh V Ho
(74) *Attorney, Agent, or Firm*—Woodcock Washburn LLP

(57) ABSTRACT

A computing device includes a storage device having a file and a file system for storing and retrieving the file on the storage device. The file includes a plurality of segments, where each of at least some of the segments is null data and each of at least some of the segments is substantive data. The file has space allocated therein for each null data segment but such allocated space is not actually filled with information, and the file has space allocated therein for each substantive data segment and such allocated space is actually filled with information. Each null data segment is not actually physically stored on the storage device and each substantive data segment is actually stored on the storage device.

6 Claims, 8 Drawing Sheets

COMPUTING DEVICE WITH RELATIVELY LIMITED STORAGE SPACE AND OPERATING/FILE SYSTEM THEREOF

CROSS REFERENCE TO RELATED APPLICATION

The present application claims the benefit of U.S. Provisional Applications Nos. 60/555,104, 60/555,392, 60/555,155, and 60/555,102, all filed on Mar. 22, 2004.

TECHNICAL FIELD

The present invention relates to computing devices in general, but especially to a computing device with a relatively limited storage space, such as for example a portable computing device with a relatively small hard disk or a random access memory (RAM) upon which is stored an operating system for such device. More particularly, the present invention relates to such a computing device and the operating/file system thereof, and especially with regard to performing file system operations in a relatively safe and efficient manner.

BACKGROUND OF THE INVENTION

In many typical computing devices such as a personal computer, a game computer, a home video recording computer, and the like, the computing device includes a relatively large storage device upon which may be stored data relating the computing device, including of course applications that can be executed thereon and an operating system and/or file system (hereinafter 'file system') that is executed thereon to operate same and to allow access to the storage device. Inasmuch as the storage device is relatively large, the amount of space used by applications and the file system thereon is relatively insignificant, and accordingly issues of file maintenance, system upgrading, file access, file storage, and the like are not especially severe.

However, when the computing device does not include such relatively large storage device, but instead includes a relatively small storage device, the amount of space used by applications and the file system thereon can become relatively significant, and the aforementioned issues can and do become more severe. For example, when the computing device is a portable computing device or the like, such as for example a portable audio or video player or a portable game computer, and is of a relatively small size, it is likely that such computing device includes a relatively small storage device, especially inasmuch as the computing device is likely limited in the functionality required, in what applications can be executed thereon, and the physical size of storage device that can be accommodated. As should be appreciated, inasmuch as the storage device is relatively small, the amount of space used by the file system thereon is relatively significant, and accordingly issues of file maintenance, system upgrading, file access, file storage, and the like now require careful consideration.

One issue that must be considered is how an application or the file system on the relatively small storage device is to be updated. In particular, in a relatively large storage device, such updating may be achieved by successfully writing update data to an unused part of the storage device and thereafter deleting corresponding old data from another part of the storage device. However, in a relatively small storage device, space thereon may not be available to write the update data prior to deleting the old data, and accordingly the old data must be deleted in order to free space prior to writing the update data.

Critically, though, if the updating of the application or file system somehow fails and the old data thereof has already been deleted, there may be no way to restore the computing device to the previous state where the non-updated application or file system could be executed on the computing device. In the case of an application, such failure may be an annoyance until the application is reloaded, if possible. However, in the case of a file system, such failure may be catastrophic inasmuch as the computing device may be inoperable without a functioning file system. Accordingly, a need exists for a method for updating an application or file system on a computing device with a relatively small storage device, where the method ensures that the update will succeed or else does not allow the update to be performed.

Another issue that must be considered is how to store files on a relatively small storage device. In particular, in a relatively large storage device, storing files is performed on a per-cluster basis, with each file using at least one cluster which can be defined as 1, 2, 4, 8, or 16 kilobytes or more. Thus, if a file with only a small amount of data (one byte, for example) is assigned to a particular cluster, all the remaining space in such cluster will go unused by any other file and is thus wasted. Such wasted space is not especially significant in a relatively large storage device, especially one with a capacity on the order of tens or hundreds of gigabytes.

However, in a relatively small storage device, such wasted space can quickly grow to a significant level, and even to the point where the storage device runs out of space. For example, a storage device with a 16 megabyte capacity and a cluster defined as 16 kilobytes can only hold about 1000 files, even if each file is only a few bytes. Moreover, it can often be the case that the relatively small storage device such as that which was set forth above does indeed have stored thereon a significant number of very small files, on the order of a few to a few hundred bytes. Accordingly, a need exists for a file system framework that efficiently uses the storage capacity of a relatively small storage device without undue wasted space.

Still another issue that is to be considered is how to store a file on a relatively small storage device when the file contains portions of unallocated or null data. As may be appreciated, such unallocated or null data within a file is data for which space exists within the file, but where such data has not been established. For example, in a particular 128 kilobyte file, it may be the case that a middle portion thereof constitutes 32 kilobytes of null data which acts as a placeholder but is to be filled in at a later time with some type of information. Thus, such null data may be represented as all zeroes or the like, and again may be filled in at some later time with substantive information.

In particular, in a relatively large storage device, the entirety of such a file including such null data is stored, even though such null data represents nothing. As may be appreciated, such 'stored' null data is wasted space on the relatively large storage device that could instead be put to better use. However, and again, such wasted space is not especially significant in a relatively large storage device, especially one with a capacity on the order of tens or hundreds of gigabytes.

However, and again, in a relatively small storage device, such wasted space can quickly grow to a significant level, and even to the point where the storage device runs out of space. Moreover, it is to be appreciated that such wasted space can interfere when attempting to build a new file on such relatively small storage device based on an old file thereon, especially when the device is almost full. Accordingly, a need exists for a structure of a file that allows for efficient use of storage capacity of a relatively small storage device, especially when the file includes null data therein.

Yet another issue that is to be considered is how to execute a file on a relatively small storage device. In particular, in a computing device that would have such a relatively small storage device, such as for example a mobile telephone, a position locator, a music player, etc., a user likely wishes that a requested action be taken almost immediately. Put another way, if the requested action requires that an executable file be executed, such a user does not want to wait for however many seconds it could take for the file to be loaded from the storage device to a local RAM or the like and readied for execution. Moreover, in certain circumstances, the nature of the action may even demand almost immediate execution, such as for example if the computing device is a portable communications device that could be employed by emergency personnel during an emergency.

The aforementioned needs are satisfied at least in part by the present invention in which a method is provided for updating an application residing on a storage device of a computing device. In the method, the update is simulated by performing all necessary actions except for actually committing data relating to the update to the storage device, and it is determined whether the simulated update succeeded. If so, the update is performed by performing the same necessary actions and also actually committing the data relating to the update to the storage device.

SUMMARY OF THE INVENTION

The aforementioned needs are satisfied at least in part by the present invention in which a method is provided for updating an application residing on a storage device of a computing device. In the method, the update is simulated by performing all necessary actions except for actually committing data relating to the update to the storage device, and it is determined whether the simulated update succeeded. If so, the update is performed by performing the same necessary actions and also actually committing the data relating to the update to the storage device.

The aforementioned needs are also satisfied at least in part by the present invention in which a computing device includes a storage device and a file system for storing and retrieving files on the storage device. The storage device includes storage space divided into sectors and the file system externally addresses the storage device on a per-sector basis, but internally divides each sector of the storage device into chunks and manages data within each sector on a per-chunk basis. Thus, the file system reads a chunk from or writes a chunk to the storage device by reading or writing the sector having the chunk.

The aforementioned needs are further satisfied at least in part by the present invention in which a computing device includes a storage device having a file and a file system for storing and retrieving the file on the storage device. The file includes a plurality of segments, where each of at least some of the segments is null data and each of at least some of the segments is substantive data. The file has space allocated therein for each null data segment but such allocated space is not actually filled with information, and the file has space allocated therein for each substantive data segment and such allocated space is actually filled with information. Each null data segment is not actually physically stored on the storage device and each substantive data segment is actually stored on the storage device.

The aforementioned needs are still further satisfied at least in part by the present invention in which a computing device includes a processor, a storage device having an executable file, and a file system for executing the file in place on the storage device on behalf of the processor. The file is divided into multiple non-contiguous fragments on the storage device, and the computing device further includes a virtual address translator interposed between the processor and the storage device for translating between physical addresses of the fragments of the file on the storage device and corresponding virtual addresses employed by the processor.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
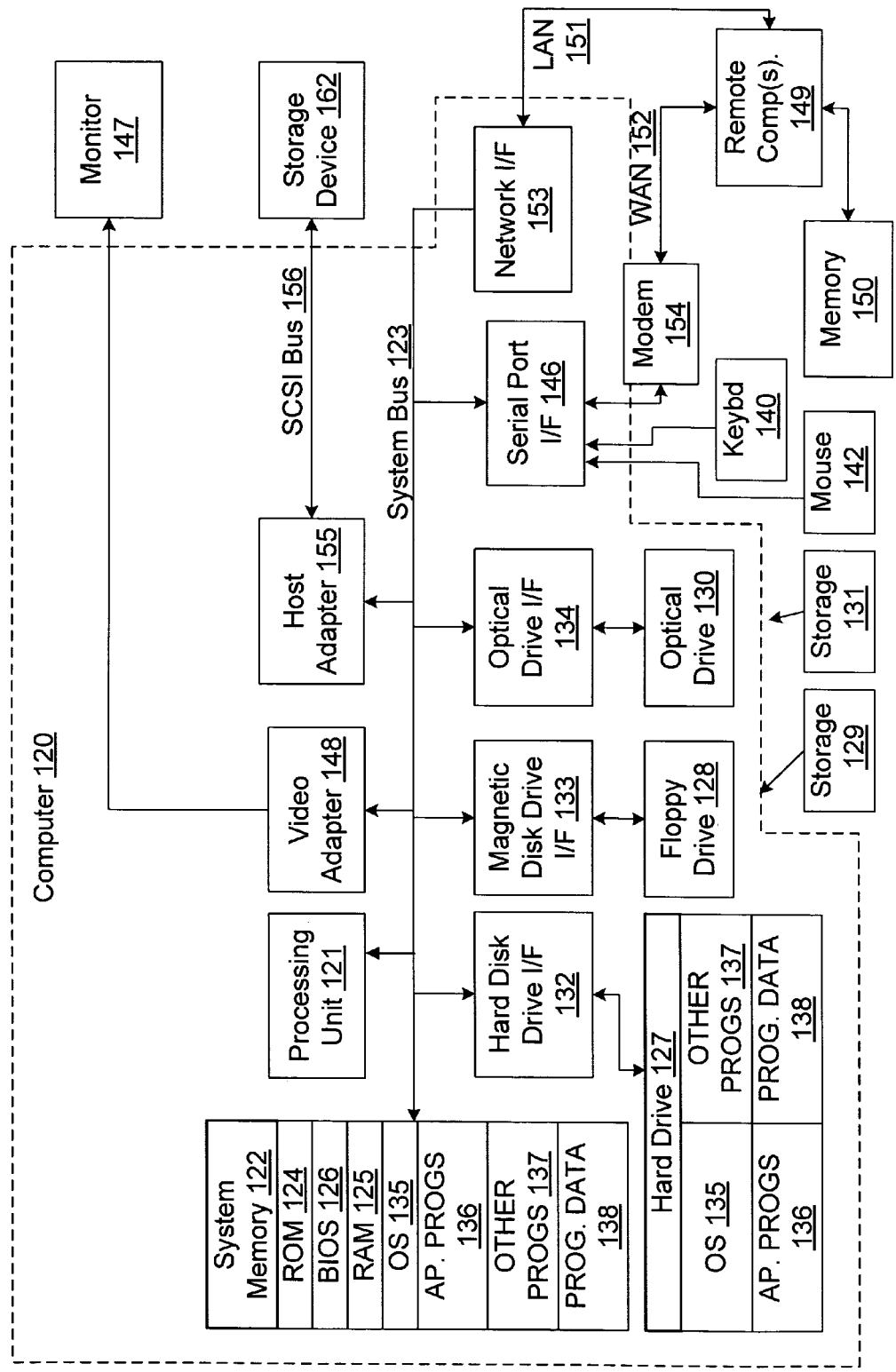
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Computing Device with Relatively Small Storage Device

Figure 2:
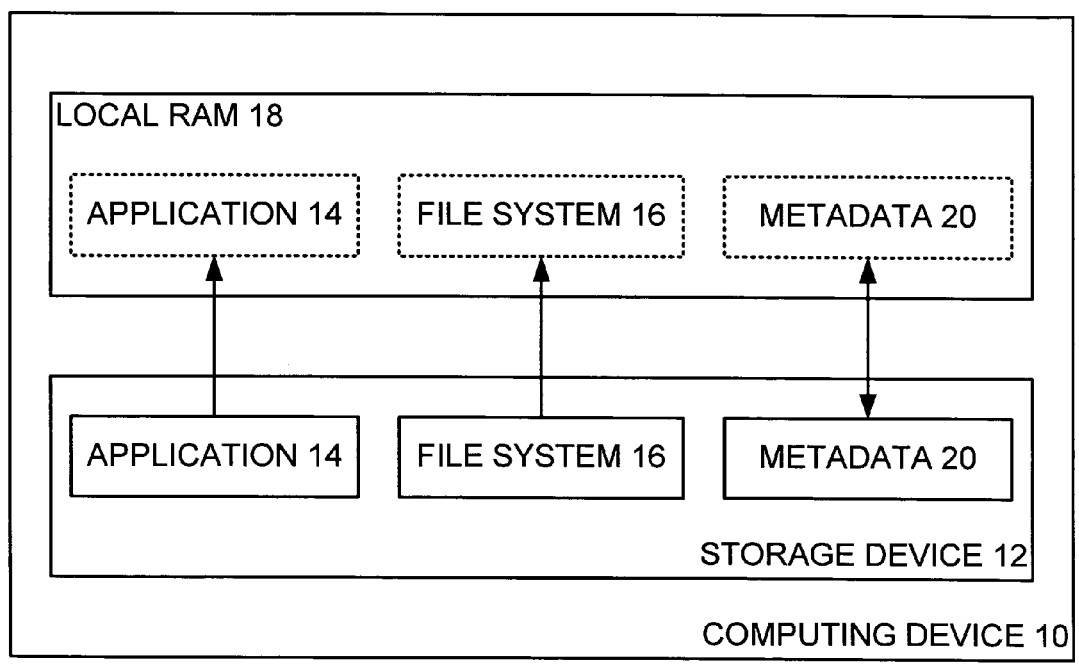
FIG. 2 is a block diagram showing a computing device with a storage device upon which is stored data including applications and a file system and metadata relating to the data.

Turning now to FIG. 2, it is seen that the present invention is believed to be especially useful in connection with a computing device 10 with a relatively small storage device 12 upon which is loaded one or more applications 14 and a file system 16. The computing device 10 may be any type of computing device without departing from the spirit and scope of the present invention, although it is likely that if the storage device 12 is relatively small, then so too is the computing device 10. For example, the computing device 10 may be a portable media player or game player, a portable digital assistant, or a portable personal computer.

The storage device 12 on the computing device 10 may be any storage device without departing from the spirit and scope of the present invention. Although the present invention is especially applicable to situations where the storage device 12 is relatively small, such storage device 12 may indeed be of any size without departing from the spirit and scope of the present invention. Depending on the computing device 10, the storage device 12 may be a hard disk drive, a memory card, flash RAM (random access memory), or the like, and such storage device 12 likely has an appropriate hardware driver (not shown), through which access thereto is managed.

Note that in addition to the storage device 12, the computing device 10 likely has a local RAM 18 from which data from the storage device 12 may be transferred prior to being manipulated. That is, the computing device 10 in at least some instances likely does not operate directly on data stored in the storage device 10, but instead copies such data from the storage device 12 to the local RAM 18, operates on the data in the local RAM 18, and then if necessary copies such operated-on data back to the storage device 12. Reasons for doing so are many and varied, but as should be appreciated typically involve faster speed and access. At any rate, such local RAM 18 may be any kind of appropriate RAM without departing from the spirit and scope of the present invention.

The applications 14 on the storage device 12 may be any applications without departing from the spirit and scope of the present invention, and may be instantiated in the local RAM 18 or elsewhere. If the computing device 10 is a task-specific device, such as for example an audio player, the applications 14 likely are likewise task-specific, although it is to be appreciated that in at least some instances other applications 14 may also be present.

It is to be appreciated that the file system 16 is in fact a type of application 14, although with special significance to the computing device 10. The file system 16 on the storage device 12 may likewise be any file system without departing from the spirit and scope of the present invention, and may be instantiated in the local RAM 18 or elsewhere. The file system 16 need not necessarily be especially task-specific but instead may be more tailored to the non-task-specific operational requirements of the computing device 10. Thus, such file system 16 is employed to operate the computing device 10 during start-up thereof and in the course of loading applications 14 thereon, and also is employed to access data on the storage device 12, the local RAM 18, and elsewhere.

Updating Application 14/File System 16 on Storage Device 12

As was noted above, updating an application 14 or the file system 16 on the relatively small storage device 12 can be complicated, especially if the storage device 12 does not have much free space available. For example, if the lack of free space on such storage device 12 prevents update data from being written thereto without first deleting old data, it can be the case that a failure during the update leaves the application 14 or file system 16 in an incoherent and likely nonfunctional state. Likewise, if the lack of free space on such storage device 12 necessitates the update being applied by modifying individual files with 'delta' data, it can also be the case that a failure during the update leaves the application 14 or file system 16 in an incoherent and likely nonfunctional state. Again, in the case of the application 14 such failure may be an annoyance until the application is reloaded, if possible, but in the case of the file system 16, such failure may be catastrophic inasmuch as the computing device 10 may be inoperable without a functioning file system 16.

Accordingly, and in one embodiment of the present invention, updating of an application 14 or the file system 16 (hereinafter, 'application 14') on a computing device 10 is performed as a two-step procedure, whereby in the first step the update is simulated, and in the second step the update is actually performed, but only if the simulated update of the first step is deemed to have succeeded. In particular, in the first step, the simulated update performs all necessary actions except for actually committing data relating to the update to the storage device 12, and in the second step, the actual update performs the same necessary actions and also actually commits the data relating to the update to the storage device 12.

To implement the present invention, it should be appreciated that the file system 16 of the computing device 10 typically maintains metadata 20 relating to data stored on the storage device 12. As may be appreciated, such data is typically stored on the storage device 12 as files, and the metadata 20 may include for each file data including a name, a size, various time stamps, the physical and/or virtual location of the file on the storage device 12 or the parts that constitute the file on the storage device 12, and various attributes with regard to the file, among other things. In addition, and assuming the storage device 12 is organized into portions of data, such metadata 20 may include for the storage device 12 a 'free' list of such portions that are available to accept data, or the equivalent.

As should be appreciated, then, modifying data in a file of the storage device 12 of the computing device 10 may also necessitate modifying metadata 20 related to the modified file, and perhaps the free list. Also typically, the file system 16 during operation thereof copies the metadata 20 or a portion thereof to the local RAM 18 or the equivalent such that the copy of the metadata 20 on the local RAM 18 is modified as necessary during operation of the file system 16, and the modified copy of the metadata 20 on the local RAM 18 is as necessary memorialized to the storage device 12.

Typically, modifications to a file on the storage device 12 by the file system 16 can include adding a new file, deleting an existing file, and modifying an existing file. Briefly, adding a new file is achieved by finding space for the file by way of the free list in the metadata 20, creating appropriate data for the file in the metadata 20, adding the data for the new file to the found space on the storage device 12, and updating the free list in the metadata to reflect the use of the found space. Likewise, deleting an existing file is achieved by removing data for the file in the metadata 20 as appropriate and updating the free list in the metadata to reflect the now-free space. Modifying an existing file is achieved in a manner akin to adding or deleting a file, depending of course on whether data is added and/or deleted from the file. At any rate, it is to be appreciated that any modification to a file results in a corresponding modification to metadata 20 associated with the file and also to metadata 20 relating to the storage device 12 itself.

With the aforementioned in mind, then, and in one embodiment of the present invention, the computing device 10 may be operated in a simulation mode and in a regular mode, whereby during the aforementioned first step where an update is simulated, the computing device 10 is operated in the simulation mode. Likewise, during the aforementioned second step where the update is actually performed, but only if the simulated update of the first step is deemed to have succeeded, and during most any other time, the computing device 10 is operated in the regular mode. Recognizing that updates to an application 14 are typically performed by an installer, the computing device 10 may be placed into and out of the simulation mode by such an installer during operation thereof.

Principally, when the computing device 10 is placed from the regular mode into the simulation mode, a copy of the metadata 20 as set forth in the local RAM 18 is saved for later retrieval, either to the storage device 12, the local RAM 18, a cache, or elsewhere. Thereafter, during operation of the computing device 10, no data is actually committed to the storage device 12. At some later point, when the computing device 10 is placed back into the regular mode from the simulation mode, the saved copy of the metadata 20 is retrieved and restored to the local RAM 18 to reflect the actual state of the storage device 12 inasmuch as the data on the storage device 12 should not have been changed during the course of the simulation mode. Thereafter, during operation of the computing device 10, data is again actually committed to the storage device 12. Thus, and as should be appreciated, placing the computing device 10 into the simulation mode should not permanently change any of the data stored on the storage device 12, and 'changes' to such data may thus be simulated without much if any risk.

As should now be appreciated, with the use of the simulation mode during the course of updating an application 14 on a computing device 10, such updating maybe performed first in a non-destructive manner so as not to modify files on the storage device 12 of such computing device 10. Thus, such simulation mode allows a pre-determination of whether a series of modifications will succeed or fail without committing the modifications to the storage device 12. When in simulation mode, all modifications to the storage device 12 are in fact made only to the metadata 20 maintained in the local RAM 18. As file contents are allocated and de-allocated, free space is tracked in the free list in the metadata 20 on the local RAM 18, but file data is not actually committed to the storage device 12. If, for example, free space becomes exhausted or the file system 16 encounters an error during a file operation, the calling entity will be notified through a return value. Significantly, if a failure occurs, the update should not be allowed to in fact take place when the computing device 12 is placed back into regular mode. Correspondingly, if no failures occur, the update should be allowed to in fact take place when the computing device 12 is placed back into regular mode, by re-running the same series of modifications.

As should now be appreciated, in the present invention, the code executed during the first step while the computing device 10 has been placed into simulation mode is identical to the code executed during the second step while the computing device 10 has been placed back into regular mode, except that all write operations for writing data to the storage device 12 are disabled during simulation mode. Therefore, if all modifications succeed in the first step during simulation mode, it can be assumed that the same sequence of modifications will also succeed in the second step during regular mode. Likewise, if any modification fails in the first step during simulation mode, it can be assumed that the same modification will also fail in the second step during regular mode, and such second step is thus not in fact performed.

Figure 3:
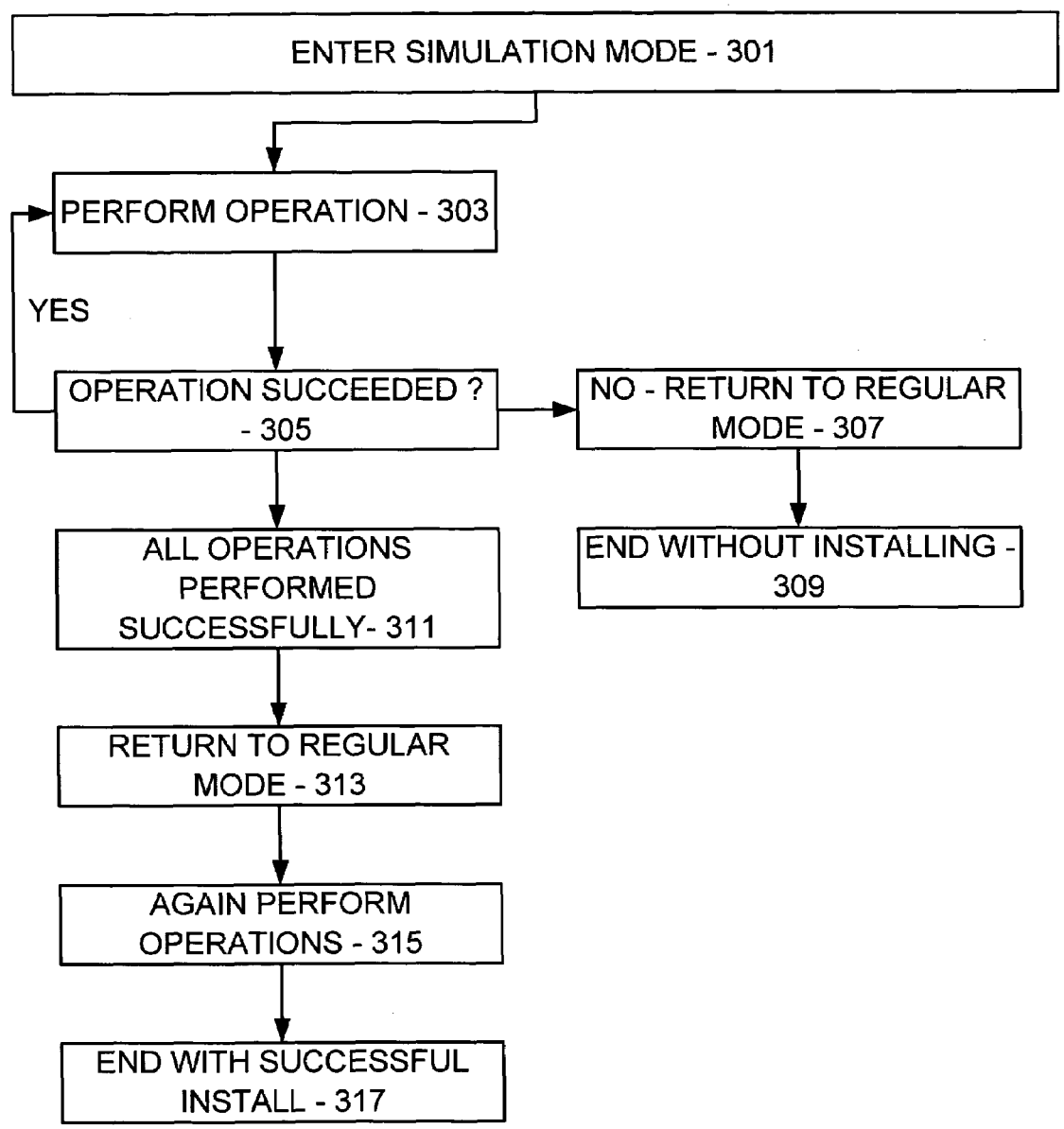
FIG. 3 is a flow diagram showing key steps performed in connection with the computing device of FIG. 2 in updating an application on the storage device in accordance with one embodiment of the present invention.

Turning now to FIG. 3, an installer or the like installing or updating an application 14 on the storage device 12 of the computing device 10 does so in the following manner. Preliminarily, the installer performs the first step by causing the computing device 10 to enter into the simulation mode (step 301). Such step may typically be performed by issuance of a command to the computing device 10 and particularly the processor or controller thereof, which of course presumes that such computing device 10 is in fact capable of accepting and understanding such command and is in fact capable of entering into the simulation mode as set forth above.

At any rate, and as was also set forth above, upon entering the simulation mode, the computing device 10 saves a copy of the metadata 20 as set forth in the local RAM 18 for later retrieval, and thereafter the file system 16 of such computing device 10 is set to not actually commit data to the storage device 12 during file operations, but to otherwise perform all other actions normally incumbent in such file operations.

Thereafter, for each file operation proscribed by the installer, the file system 16 in fact performs such file operation, except of course for actually committing data to the storage device 12 (step 303). With the understanding that each such file operation is typically issued as a call with a return value indicative of success or failure, the installer receives the return value associated with the file operation and determines therefrom whether the operation succeeded (step 305). Note, too that such installer may determine whether the operation succeeded based on criteria independent of such a return value, such as for example based on code included with such installer or based on a determination of a particular system value.

If the operation did indeed succeed, the installer performs the next file operation as at step 303. However, if the operation failed for any reason, the installer instead causes the computing device 10 to return to the regular mode (step 307), typically by issuance of a command to the computing device 10 and particularly the processor or controller thereof, which again presumes that such computing device 10 is in fact capable of accepting and understanding such command and is in fact capable of returning to the regular mode as set forth above.

Critically, upon returning to the regular mode as at step 307 by way of the determination that an operation did not succeed as at step 305, the installer does not in fact perform the update, but instead ends the procedure based on the assumption that the computing device 10 is not capable of receiving the update (step 309). As was set forth above, when the computing device 10 is placed back into the regular mode from the simulation mode as at step 307, the saved copy of the metadata 20 is retrieved and restored to the local RAM 18 to reflect the actual state of the storage device 12 inasmuch as the data on the storage device 12 should not have been changed during the course of the simulation mode. Thereafter, during operation of the computing device 10, data is again actually committed to the storage device 12.

Note that if the update ends at step 309, the update is not in fact applied and the application 14 that was to have been updated should remain on the storage device 12 in a non-updated state. Significantly, although not updated, such application 14 is at least not left in some unfinished state of update that would either cause the application 14 to function in an impaired manner, or worse yet cause the application 14 to not function at all.

Returning now to each operation performed as at step 303, and presuming that no operation has been found to have failed as at step 305, the installer at some point will have determined that all operations have been performed (step 311). Thus, step one has concluded with the update being successfully simulated. Accordingly, such update may now in fact be performed as at step two.

In particular, with a successful simulation, the installer causes the computing device 10 to return to the regular mode (step 313), again typically by issuance of a command to the computing device 10 and particularly the processor or controller thereof. Critically, upon returning to the regular mode as at step 313 by way of the determination that all operations succeeded, the installer does in fact perform the update. As was set forth above, when the computing device 10 is placed back into the regular mode from the simulation mode as at step 313, the saved copy of the metadata 20 is retrieved and restored to the local RAM 18 to reflect the actual state of the storage device 12 inasmuch as the data on the storage device 12 should not have been changed during the course of the simulation mode. Thereafter, during operation of the computing device 10, data is again actually committed to the storage device 12.

To in fact perform the update, and for each file operation proscribed by the installer, the file system 16 in fact performs such file operation (step 315). Significantly, inasmuch as the computing device 10 is now in the regular mode, the file system 16 does in fact actually commit data to the storage device 12 in connection with each such operation. Again, the installer at some point will have determined that all operations have been in fact performed, will have thus concluded that the update of the application 14 has been successfully installed, and will end (step 317).

Note that the installer in the course of performing each file operation as at step 315 may determine whether the operation succeeded in a manner akin to that at step 305 (not shown). However, such a step is not believed to be absolutely necessary to the present invention inasmuch as each operation was previously successfully simulated as at step 303. Nevertheless, instances can occur where an operation could succeed in simulation mode but fail in regular mode. That said, however, such instances are believed to be rare and beyond the scope of the present invention.

The present invention operates by simulating an update without committing any data to the storage device 12 during such simulated update. The operations performed in simulation mode are identical to the operations performed in regular mode with the exception of committing data to the storage device 12, which are disabled during simulation mode. Therefore, if all update operations succeed in simulation mode, the installer can assume the same sequence of operations will also succeed in regular operation, except for example certain cases of catastrophic failure of the storage device 12.

It should be appreciated that certain minor modifications may be necessary if the update includes operations on data that is expected to have been committed to the storage device 12 but in fact has not. Generally, and as should also be appreciated, such minor modifications require caching of such data and redirecting performance of such operations to such cached data.

Efficient Use of Capacity of Storage Device 12

Typically, a storage device such as the storage device 12 cannot address each individual byte of information stored thereon. As should be appreciated, to do so is not usually necessary, and more importantly doing so would require unduly large address information which would be unwieldy and would make tracking information related to the storage device more complicated. Such tracking information may for example include lists of free and/or used space, lists of bad space, etc. Instead, and turning now to FIG. 4, a storage device usually subdivides the space thereof according to addressable sectors 22 of information, where each sector 22 may be defined to have on the order of 512 or 1024 bytes, and such a storage device would then read and write data on a per-sector basis according to an address thereof, even if only a few bytes within a sector 22 are to be dealt with.

Figure 4:
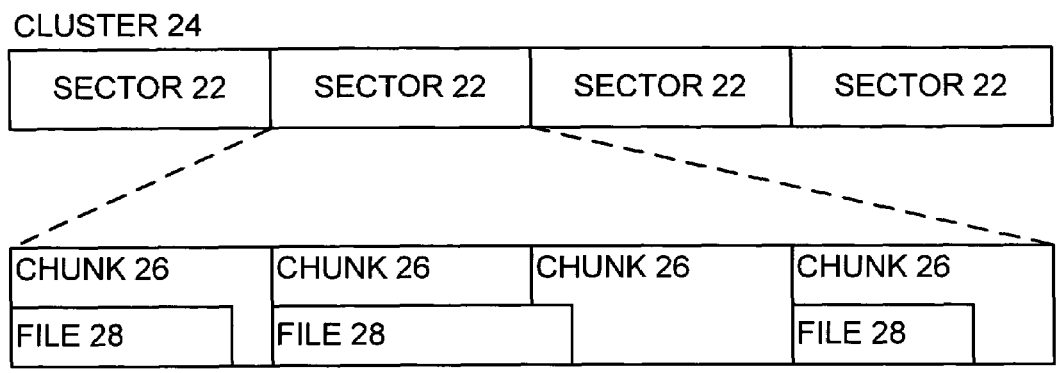
FIG. 4 is a block diagram showing sectors on the storage device of FIG. 2 subdivided into chunks.

A typical file system could address such a storage device on a per-sector basis, although with regard to a relatively large storage device upon which is stored larger files 28 it is usually more convenient to define a cluster 24 as a number of sectors 22, to address such storage device on a per-cluster basis, and to require that each file 28 use at least one cluster 24 (not shown as such in FIG. 4). As before, doing so allows the file system to avoid unduly large address information which would be unwieldy and would complicate tracking information related to the storage device, such as the aforementioned free list in the metadata 20. Typically, a cluster 24 is a base-2 multiple of sectors 22, such as for example 1, 2, 4, 8, or 16 kilobytes or more, and the file system would read from and write to the storage device on a per-cluster basis even if only a few sectors 22 within a cluster 24 are to be dealt with.

However, and as was pointed out above, if a file 28 with only a small amount of data (a few to a few hundred bytes, for example) is assigned to a particular cluster 24, all the remaining space in such cluster 24 is wasted, and in a relatively small storage device, such wasted space could quickly become significant. Accordingly, in one embodiment of the present invention, and as a first measure, the file system 16 for the storage device 12 of FIG. 2 does not address such storage device 12 on a per-cluster basis but instead addresses same on a per-sector basis, and therefore requires that each file 28 use at least one sector 22 of the storage device 12 (not shown as such in FIG. 4). As a result, and as may be appreciated, a relatively small file 28 on the order of a few to a few tens of bytes stored on for example a 512 byte sector 22 wastes only a few hundred bytes, and does not waste thousands of bytes as would be the case with for example an 8 kilobyte cluster 24.

Note that while requiring the file system 16 to address the storage device 12 on a per-sector basis results in longer and therefore more complicated addressing as compared with on a per-cluster basis, the amount of space that is to be addressed is relatively small for a relatively small storage device 12, and addresses therefor are thus also relatively small. For example, for a 16 megabyte storage device 12 with 8 kilobyte clusters and 1 kilobyte sectors, addressing on a per-sector basis requires addresses with three additional bits, but such addresses are still only 14 bits long, which should be considered reasonable.

As may be appreciated, even with the file system 16 addressing the storage device 12 on a per-sector basis, it may still be considered unacceptably inefficient to waste hundred or even tens of bytes when a relatively small file 28 on the order of a few to a few tens of bytes is stored on for example a 512 byte sector 22. Accordingly, in one embodiment of the present invention, and as a second measure, the file system 16 while still addressing the storage device 12 on a per-sector basis internally manages the data within each sector on a per-chunk basis, where each chunk 26 (FIG. 4) is for example defined as a base-2 division of a sector 22.

In storing files 28 on a per-chunk basis (as shown in FIG. 4), and as should be appreciated, the file system 16 would internally require that each file 28 use at least one chunk 26 of the storage device 12, but would still externally address the storage device 12 on a per-sector basis. Thus, to read from or write to the storage device 12 a particular chunk 26, the file system 16 would have to read or write the sector 22 having the chunk 26. As a result, the file system 16 not only must keep track of the each sector 22 used by a file 28 but each chunk 26 within each sector 22 used by the file 28. Doing so, while more elaborate, is not believed to be overly burdensome, and may be performed in any appropriate manner without departing from the spirit and scope of the present invention. At any rate, and as should also be appreciated, a relatively small file 28 on the order of a few to a few tens of bytes stored on for example a 64 byte chunk 26 wastes only a few to a few tens of bytes, and does not waste hundreds of bytes as would be the case with for example a 512 byte sector 22.

Similar to before, it should be noted that while requiring the file system 16 to internally address files 28 on a per-chunk basis results in longer and therefore more complicated addressing as compared with on a per-sector basis, the amount of space that is to be addressed is relatively small for a relatively small storage device 12, and addresses therefor are thus also relatively small. To continue the previous example, for a 16 megabyte storage device 12 with 1 kilobyte sectors 22 and 256 byte chunks 26, addressing on a per-chunk basis requires addresses with two additional bits, but such addresses are still only 16 bits long, which should be considered reasonable.

Note that as with the size of each cluster 24 and the size of each sector 22, the size of each chunk 26 should be defined for the file system 16 when the storage device 12 is initially formatted and/or partitioned. However, it is to be appreciated that the storage device 12 is not addressed by the file system 16 on a per-chunk basis and therefore need not be aware of the size of each chunk 26. Instead, and again, the file system 16 internally organizes the files 28 on the storage device 12 on a per-chunk basis, but externally addresses the storage device 12 on a per-sector basis.

As alluded to above, the file system 16 must maintain for each file 28 on the storage device 12 locating information for locating each sector 22 used by the file 28 and each chunk 26 within each sector 22 used by the file 28. As may be appreciated, doing so is relatively simple in an instance where a file 28 is contiguous on a single sector 22, in which case the file system 16 need only note in pertinent part the address of the sector 22, the address of the starting chunk 26 within the sector 22, and the length of the file in chunks 26. However, if the file 28 is in two contiguous fragments on a single sector 22, the file system 16 now must note the address of the sector 22, the address of the starting chunk 26 of the first fragment within the sector 22, the length of the first fragment in chunks 26, the address of the starting chunk 26 of the second fragment within the sector 22, and the length of the second fragment in chunks 26. As may be appreciated, as a file 28 becomes more fragmented, such file 28 may come to reside on multiple sectors 22 and in multiple chunks 26 on each sector, and correspondingly the locating information for locating all the fragments of the file 28 likewise becomes much larger.

As should be understood, such locating information may be stored in a list maintained by the file system 16. Alternatively, the bulk of such locating information may be stored with the file 28 itself as a header or the like, in which case the file system 16 need only maintain so much information as is necessary to find such header. In the latter case, and as should also be understood, if such locating information is relatively large, such information may be separate from the header with such header including references thereto as appropriate.

At any rate, at some point as a file 28 becomes larger and especially as the file 28 becomes more fragmented, the locating information therefor becomes unacceptably large, especially in the case where the storage device 12 is relatively small and use of the space thereof is to be done with relatively high efficiency. Such problem becomes especially exacerbated as the defined size of each chunk 26 becomes smaller and the file 28 thus may become spread over more fragments. Also, at some point as a file 28 becomes larger and more fragmented, locating and reading the file 28 from or writing the file 28 to the storage device 12 becomes unacceptably cumbersome, especially in the case where an unacceptably high number of read or write operations must be performed due the number of fragments of the file 28. As before, such problem becomes especially exacerbated as the defined size of each chunk 26 becomes smaller and the file 28 thus may become spread over more fragments.

Thus, and to summarize, the file system 16 more efficiently stores each file 28 on the storage device 12 space-wise by doing so on a per-chunk basis, where each chunk 26 is smaller than a sector 22, but in doing so the file 28 likely becomes more fragmented as the file gets larger, to the point where the locating information for such fragmented file 28 becomes unacceptably large and storing and retrieving the fragmented file 28 becomes unduly cumbersome. Accordingly, in one embodiment of the present invention, and as a third measure, the file system 16 while still internally managing each file 28 on a per-chunk basis nevertheless imposes a minimum size requirement on each file 28 such that the file 28 cannot be fragmented into parts smaller than the minimum size. For example, for a storage device 12 with 4 kilobyte sectors 22 and 256 byte chunks 26 (i.e., 16 chunks 26 per sector 22) a minimum-size block 30 (FIG. 4) could be defined as 1, 2, 4, or even 8 kilobytes or more. Note that in at least some instances such a minimum-size block 30 (FIG. 4A) could run across multiple sectors 22, but that such an instance is not believed to be problematic.

Figure 4A:
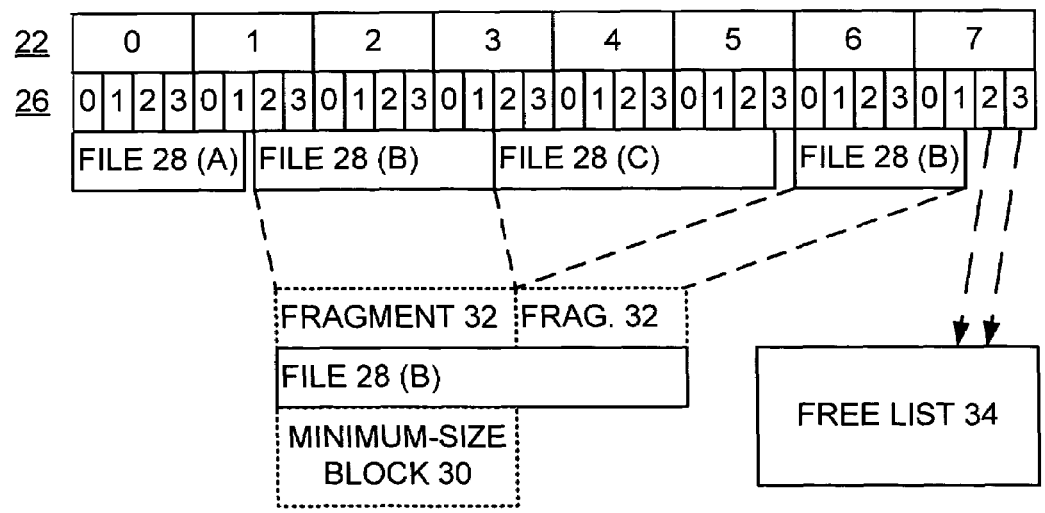
FIG. 4A is a block diagram showing files stored according to the chunks of FIG. 4 and a minimum-size block for each fragment of each file in accordance with one embodiment of the present invention.

In storing files 28 on a minimum-size block basis (as shown in FIG. 4A), and as should be appreciated, the file system 16 would internally require that if a file 28 is to be stored in a fragmented form on the storage device 12, each fragment 32 is to be at least as large as the defined minimum-size block 30, excepting of course for any remainder fragment 32 of the file 28 that does not fill such a minimum-size block 30. In doing so, the file system 16 must maintain a 'free' list 34 of chunks 26 that are available to accept data, or the equivalent, and consult therewith. Doing so should be known or apparent to the relevant public and therefore need not be set forth herein in any detail. The file system 16 may therefore employ any method of employing such a free list 34 and dividing a file 28 into fragments 32 based on such free list 34 and a minimum-size block 30 without departing from the spirit and scope of the present invention.

Note that as with the size of each chunk 26, the minimum-size block 30 should be defined for the file system 16 when the storage device 12 is initially formatted and/or partitioned. However, it is to be appreciated that the storage device 12 is not addressed by the file system 16 with any direct reference to the minimum-size block 30 and therefore need not be aware of same.

Note, too, that by imposing the requirement of a minimum-size block 30, the file system 16 may lose some of the efficiency gained by employing chunks 26 in storing data on the storage device 12. Nevertheless, such lost efficiency should be offset and even outweighed by the increased efficiency obtained from reduced file fragmentation. Moreover, chunks 26 of space on the storage device 12 that are unavailable to a particular file 28 based on the requirement of the minimum-size block 30 are still available to other files 28.

In at least some instances, the file system 16 may increase efficiency of used space on the storage device 12 by compressing each file 28 before storing same. If so, and in one embodiment of the present invention, the file 28 is divided into fragments 32 having the size of the minimum-size block 30 and each fragment 32 is thus compressed. Each such compressed fragment 32 is thus of a size smaller than the minimum-size block 30 but nevertheless such an arrangement has been found to work well overall.

File Structure for File with Null Data Therein

As was set forth above, in certain instances a file 28 on a storage device such as the storage device 12 may contains portions of unallocated or null data such that space exists within the file 28 but is not filled with substantive data. Such null data may instead simply be represented as all zeroes or some other placeholder value, and exists only to be filled in at some later time with such substantive data. Alternatively, such null data may be created when substantive data is removed from the file 28 for whatever reason.

Thus, it may be the case that a relatively large file 28 exists on the storage device 12, but in fact such file 28 is for the most part null data, either in a single contiguous portion or as a plurality of contiguous or non-contiguous portions. In such instance, and particularly where the storage device 12 is relatively small, it would be highly useful to in fact free the space occupied by the null data of the file 28. Accordingly, such otherwise occupied space can be made available to be employed by another file 28.

Figure 5:
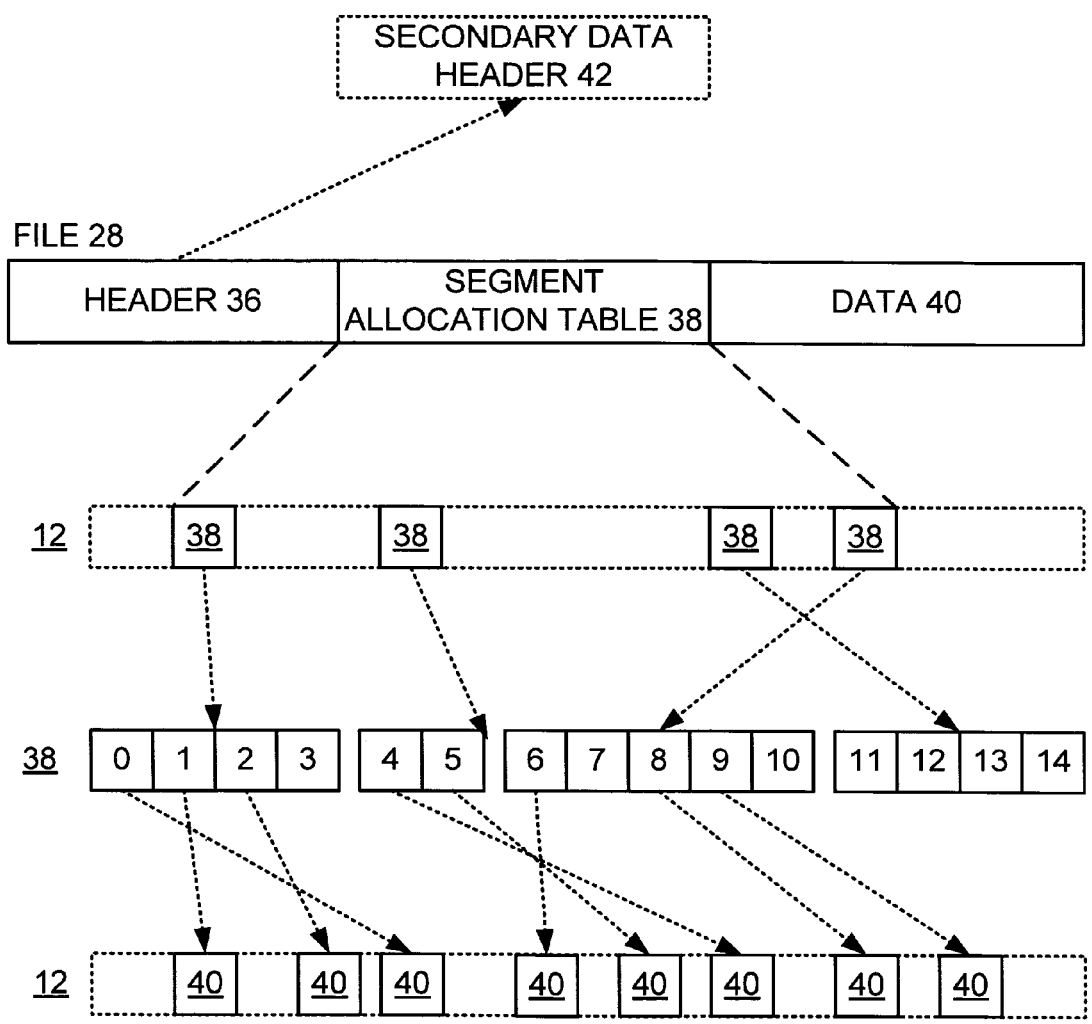
FIG. 5 is block diagram showing a file stored on the storage device of FIG. 2 according to a sparse implementation whereby null data segments of the file are not in fact stored in accordance with one embodiment of the present invention.

In one embodiment of the present invention, and turning now to FIG. 5, to in fact free space occupied by null data within a file 28, such file 28 is stored by the file system 16 on the storage device 12 according to the structure shown. In particular, and as seen, such file 28 includes a file header 36, a segment allocation table 38, and the actual file data 40 except for the null data.

As may be appreciated, the file header 36 includes information about the file 28 including file attributes, file size, time stamps, the file name, and the like. In addition, and in the present invention, the file header 36 includes a reference to a location of the segment allocation table 38 therefor on the storage device 12. Note that such reference may be to a single contiguous segment allocation table 38, or to multiple non-contiguous portions of such a segment allocation tables 38 that are to be combined to form a single contiguous table 38. If the segment allocation table 38 is highly fragmented, the file header 36 can even refer to a list of secondary data headers 42 which contain references to additional locations of portions of the segment allocation table 38.

At any rate, the segment allocation table 38 may be constructed from such portions based on such references in a manner that should be apparent to the relevant public and therefore need not be set forth herein in any detail. Upon in fact constructing the segment allocation table 38, as is shown in FIG. 5, it is to be seen that such table 38 includes ordered references to locations of the actual file data 40 that constitutes the file 28. As may be appreciated, such references may be to fixed- or variable-length segments of the actual file data 40. In the former case, the fixed length may for example be the aforementioned minimum-sized block 30, while in the latter case each reference should include a length attribute. Of course, employing fixed-length segments obviates the need for such length attributes.

Thus, whenever the file 28 is opened for reading or writing by an application, the file header 36 is examined to locate all pieces of the segment allocation table 38, and such pieces are copied from the storage device 12 into a contiguous section of the local RAM 18 or the like. Thereafter, data 40 for the file 28 may be located by indexing into the contiguous segment allocation table 38 to find the location for such data 40 on the storage device 12. As may be appreciated, as new data is written to the file 28, the table 38 is extended as necessary to encompass the segment at the furthest offset into the file 28. Note that in order to limit fragmentation of the table 38, such table 38 may be pre-allocated to the intended file size, especially if the final size of the file 28 is already known and the segments of the data 40 are fixed in length.

Significantly, in the present invention, the data 40 for the file 28 is stored on the storage device 12 in a 'sparse' manner, whereby substantive segments of the data 40 are referenced by the segment allocation table 38 and in fact are stored, while null segments of the data 40 are noted by the segment allocation table 38 but are not in fact stored or referenced. In particular, for each segment with substantive data 40, the corresponding entry in the segment allocation table 38 includes a reference, while for each segment with only null data 40, the corresponding entry in the segment allocation table 38 includes no reference or else a null reference. Thus, the file 28 shown in FIG. 5 has 15 segments, but segments 3, 7 and 10-14 have null data 40 and are thus not actually referenced by any entry of the segment allocation table 38.

Note that in writing the file 28 as shown in FIG. 5, the file system 16 of the computing device 10 does not actually write the null segments of data 40 but instead merely creates appropriate entries therefor in the segment allocation table 38 for such file 28. With the present invention, then, the file system 16 reads data 40 from any offset of the file 28 using appropriate calls to the storage device 12 based on the segment allocation table 38 for the file 28, and likewise, the file system 16 writes data 40 to any offset of the file 28 using appropriate calls to the storage device 12 based on the segment allocation table 38 for the file 28. Significantly, any physical portion of the storage device 12 allocated to the file 28 can later be de-allocated if no longer needed, thus freeing space on such storage device 12.

Thus, the file system 16 may replace null segments within a file 28 with substantive segments of data 40 by writing such substantive segments of data to the storage device 12 and updating the entries therefor in the segment allocation table 38 with appropriate references. Similarly, the file system 16 may replace substantive segments of data 40 with null data at some later point by updating the entries therefor in the segment allocation table 38 with null references or to remove existing references. The replaced substantive data 40 may for example be physically deleted, moved to another location, or may be left to be overwritten by other data 40. Notably, in the present invention, when replacing substantive data 40 with null data 40, the space on the storage device 12 occupied by such replaced substantive data 40 is in fact freed up and available to accept other data 40, and accordingly the file system 16 should update the free list 34 to reflect same.

With the present invention, and as should now be appreciated, a file 28 need not necessarily be constructed in a linear fashion from beginning to end. Instead, a file system 16 with knowledge of the size of the file may establish a segment allocation table 38 therefor and then populate segments of data 40 for the file 28 in any order on the storage device 12. Significantly, while populating each such segment of data 40 on the storage device 12, the file system appropriately references same in a corresponding entry in the table 38.

Notably, with the file structure of the present invention as shown in FIG. 5, the file system 16 may construct a new file 28 with parts of an old file 28 to be deleted, such as for example when updating a file 28, and in doing so can deconstruct the old version of the file 28 and free space on the storage device 12 while constructing the new version of the file 28. In fact, the freed space from the old version of the file 28 may be used to store at least part of the new version of the file 28. Thus, and particularly in a storage device 12 with little space left, updating a file 28 does not necessarily require enough free space to construct the new version of the file 28 without deleting the old version of such file 28.

Figure 6:
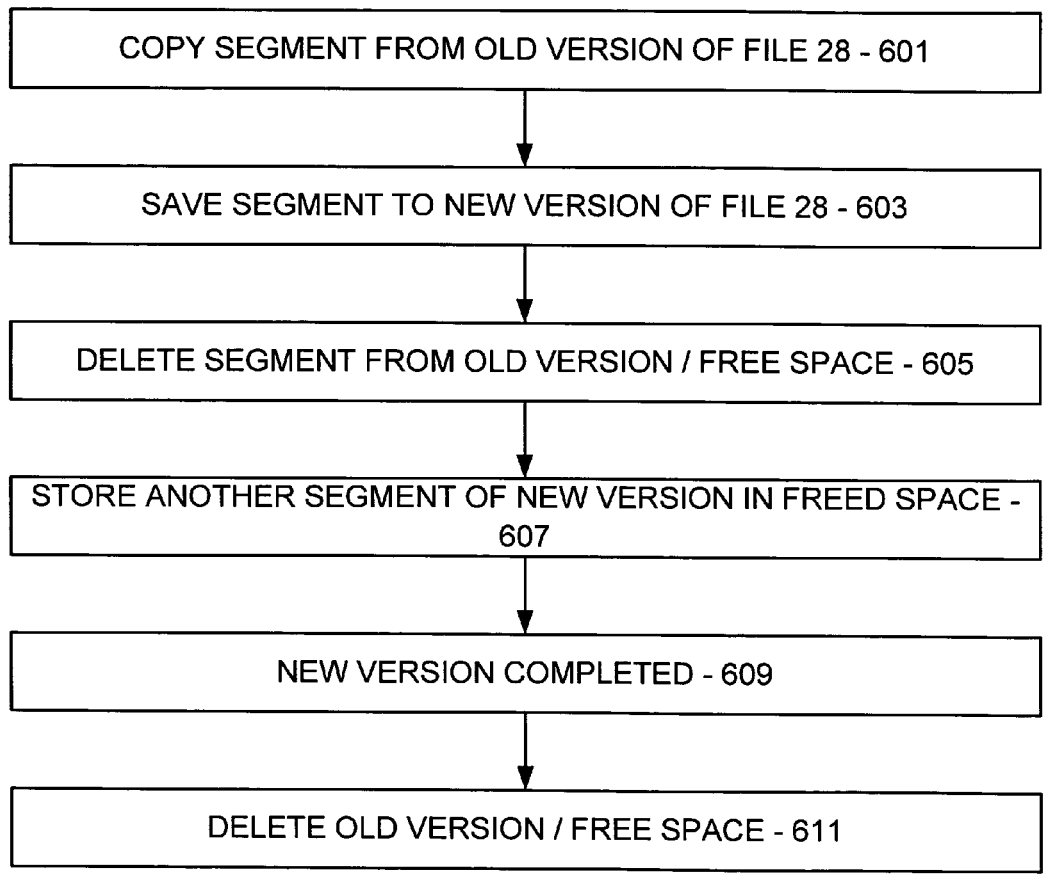
FIG. 6 is a flow diagram showing key steps performed in connection with the sparse implementation of file storage of FIG. 5 in accordance with one embodiment of the present invention.

Instead, and as seen in FIG. 6, if the new version of the file 28 is to include a segment from the old version of the file 28, such segment may be copied from the old version of the file 28 (step 601) and saved to the new version of the file 28 (step 603) along with appropriate modification of the segment allocation table 38 of the new version of the file 28. Thereafter, such segment may be deleted from the old version of the file 28 (step 605) along with appropriate modification of the segment allocation table 38 of such file 28, and the space freed from the storage device 12 based on such action may then be employed to store another segment of the new version of the file 28 (step 607) along with appropriate modification of the segment allocation table 38 of such file 28.

As should now be appreciated, such steps may be repeated numerous times, with the physical size of the new version of the file 28 increasing on the storage device 12 as the physical size of the old version of the file 28 decreases, until eventually the new version of the file 28 is completely constructed (step 609). The old version of the file 28 may then be deleted to free up space occupied by any remaining segments of such old file 28 on the storage device 12 (step 611).

Note that in at least some circumstances, a segment need not be physically copied from the old version of the file 28, saved to the new version of such file 28, and deleted from the old version of the file 28, as at steps 601-605. Instead, it maybe enough to merely de-reference the segment from the segment allocation table 38 of the old version of the file 28, and to reference the same segment in the segment allocation table 38 of the new version of the file 28.

With the present invention, and as should now be appreciated, a file 28 may be stored on a storage device 12 in a sparse manner such that null portions of the file 28 are not in fact stored. Thus, space on the storage device 12 is freed and available for other files 28, while at the same time such null portions of the file 28 may be populated with substantive data 40 at some later time.

Executing File in Place on Storage Device

As was set forth above, in certain instances it is desirable to execute an executable file 28 on the storage device 12 almost immediately and without loading same to the local RAM 18 or another location. For example, it may be the case that the computing device 12 is expected to react from user commands on demand and in an almost instantaneous manner, where such commands require executing such an executable file 28. Alternatively, it may be desirable to dispense with use of the local RAM 18 for executing the file 28.

As was set forth above, a typical storage device 12 for a computing device 10 can only be addressed on a per-cluster or per-sector basis. Each byte in the storage device 12 therefore cannot be directly accessed therefrom without reading the sector 22 or cluster 24 thereof. As a result, a file 28 cannot normally be executed directly from such typical storage device 12, especially inasmuch as such execution normally requires access to such file on a per-byte. Accordingly, to execute the file 28, such file 28 is typically loaded from the storage device 12 to the local, where it may be appreciated that each byte of such file 28 can in fact be directly accessed.

In one embodiment of the present invention, however, the storage device 12 is in fact addressable on a per-byte basis. For example, such storage device 12 may be a NOR flash RAM which, as may be appreciated, in fact allows direct addressable access thereto on a per-byte basis. NOR flash RAM is known to the relevant public and therefore need not be set forth herein in any detail. Accordingly, any appropriate type of such NOR flash RAM may be employed as the storage device 12 of a computing device 10 without departing from the spirit and scope of the present invention.

Thus, the file 28 may be executed in place on such NOR flash RAM storage device 12. However, to in fact be executed in place on such NOR RAM 12 (FIG. 7), several requirements should be met.

As a first requirement, and as an initial matter, the NOR RAM 12 should be accessible to the file system 16 of the computing device 10, just as is such NOR RAM 12 were another storage device such as a drive. To do so, then, the NOR RAM 12 requires a corresponding access driver 44. Generally, and as should be appreciated, the access driver 44 is a piece of software running on the computing device 10 which in response to calls for data 40 from the NOR RAM 12 by the file system 16 based on physical addresses can in fact retrieve such data 40, among other things. Such an access driver 44 is known to the relevant public and therefore need not be set forth herein in any detail. Accordingly, any appropriate type of such an access driver 44 may be employed without departing from the spirit and scope of the present invention, presuming of course such access driver 44 includes appropriate functionality.

As a second requirement, the file 28 should not be stored on the NOR RAM 12 in a compressed form. As may be appreciated, doing so would not in fact allow the file 28 to be executed in place on such NOR RAM 12, inasmuch as such file 28 would have to be loaded elsewhere, such as for example the local RAM 18, and decompressed.

Note that unless the file 28 is stored on the NOR RAM 12 in a contiguous or non-fragmented form and with appropriate physical branching addresses, such file 28 typically could not be executed in place on the NOR RAM 12. However, in one embodiment of the present invention, such file 28 in fact can be executed in place on the NOR RAM 12 even if in a non-contiguous or fragmented form. However, to do so, and as a third requirement, such file 28 specifies a starting virtual address and is stored on the NOR RAM 12 with appropriate virtual branching addresses based on the specified starting virtual address.

Figure 7:
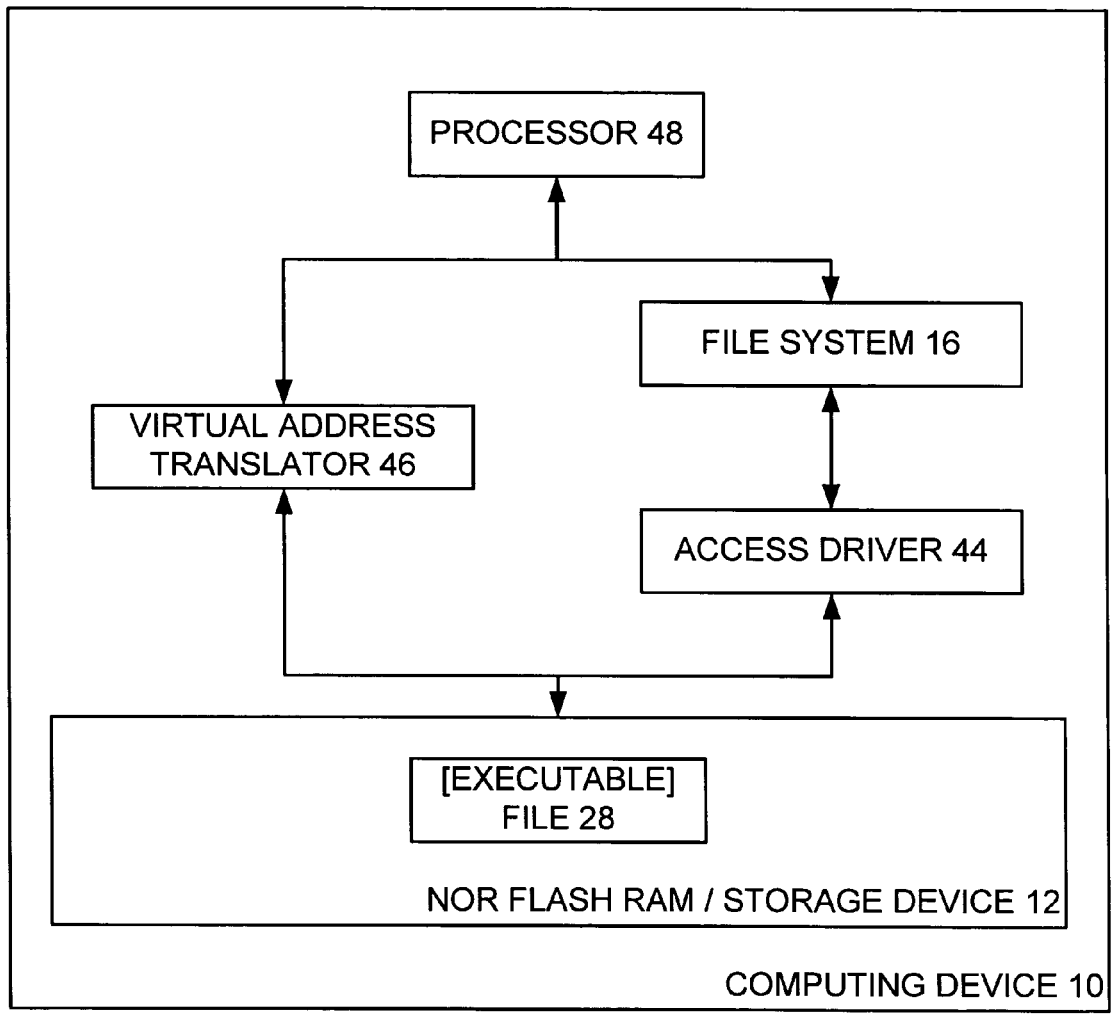
FIG. 7 is block diagram showing a file stored on the storage device of FIG. 2 and executable in place in accordance with one embodiment of the present invention.

Thus, as seen in FIG. 7, and as a fourth requirement, the computing device 10 must include a virtual address translator 46 that can translate between the physical addresses of the fragments 32 of the file 28 on the NOR RAM 12 and corresponding virtual addresses which a processor 48 or the like on the computing device 10 may employ. As should be appreciated, such processor 48 in executing the file 28 in place 28 would do so by fetching instructions from the file 28 based on such virtual addresses and the virtual address translator 46.

Thus, with the virtual address translator 46, the file 28 on the NOR RAM 12 appear to be contiguous, at least to the processor 48, and the virtual branching addresses within the file 28 are correct, presuming of course that the starting virtual address within the file 28 is in fact employed therefor by the virtual address translator 46. Generally, and as should also be appreciated, the virtual address translator 46 functions by maintaining mappings between such physical and virtual addresses for the file 28. Such a virtual address translator 46 is known to the relevant public and therefore need not be set forth herein in any detail. Accordingly, any appropriate type of such a virtual address translator 46 may be employed without departing from the spirit and scope of the present invention.

Figure 8:
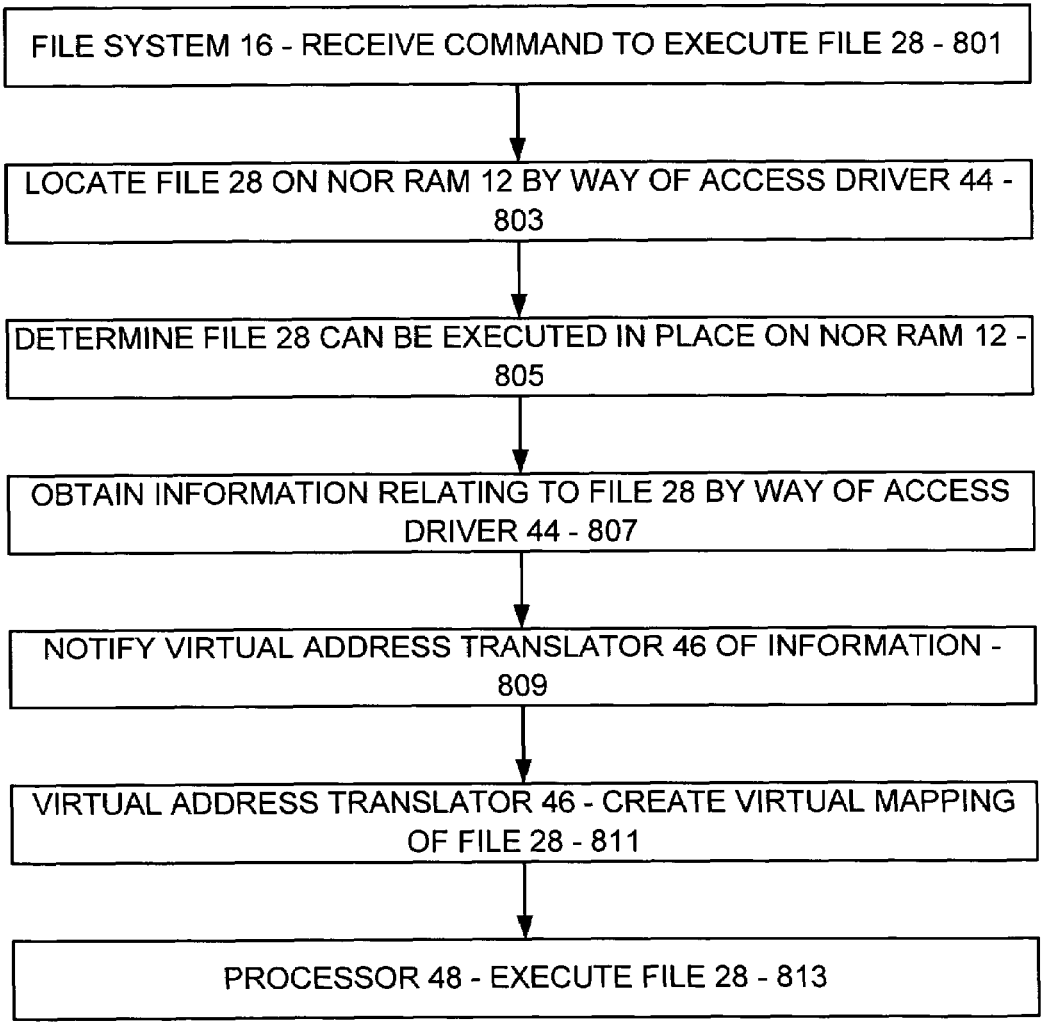
FIG. 8 is a flow diagram showing key steps performed in connection with executing the file of FIG. 7 in place in accordance with one embodiment of the present invention.

In operation, then, and turning now to FIG. 8, the computing device 10 executes a file 28 in place on the NOR RAM 12 in the following manner. Preliminarily, of course, the file system 16 is engaged by a user or other entity to execute the file 28 by way of an appropriate command (step 801), and thus locates such file 28 on the NOR RAM 12 by way of the access driver 44 (step 803). Thereafter, the file system 16 determines that the file 28 can in fact be executed in place on the NOR RAM 12 (step 805) by determining that the file 28 does reside on the NOR RAM 12, is not compressed, specifies a virtual start address and contains virtual branch addresses based thereon, and can be virtually mapped, among other things.

Presuming that the file 28 can in fact be executed in place on the NOR RAM 12, then, the file system 16 obtains necessary information relating to the file 28 by way of the access driver 44, including the aforementioned virtual start address and the physical location and length of each fragment 32 of the file 28 (step 807), and notifies the virtual address translator 46 regarding same (step 809). As should now be appreciated, with such information, the virtual address translator 46 creates a mapping of the file 28 from the multiple non-contiguous physical locations on the NOR RAM 12 to a single contiguous virtual location starting at the virtual start address specified by the file 28 (step 811).

Note that inasmuch as the virtual branch addresses within the file 28 on the NOR RAM 12 are already set up to be correct based on the specified virtual start address, neither the virtual address translator 46 nor the processor 48 need concern itself with correcting same. At any rate, with the created mapping, the processor 48 is ready to execute the file 28 (step 813) by appropriately issuing commands based on the virtual address as mapped by the virtual address translator 46. Thus, based on such virtual addresses, the translator 46 locates data 40 to be executed in connection with the file 28 directly from the NOR RAM 12. Note that in doing so, the file system 16 and the access driver 44 need not be employed by the processor 48.

With the present invention, and as should now be appreciated, a file 28 may be executed in place on the storage device 12 of the computing device 10, even if non-contiguous. To do so, the file 28 must not be compressed and must be stored with correct virtual addresses based on a predefined virtual start address, the storage device 12 must be accessible by the file system 16 by way of an access driver 44, and a virtual address translator 46 must be able to directly access the storage device 12 based on translations of virtual addresses to physical addresses.

Although the present invention is set forth above in terms of specific elements performing specific actions, it is to be appreciated that the functionality of one element may be subsumed by another element without departing from the spirit and scope of the present invention. For example, it may be the case that the file system 16 includes the functionality of the access driver 44, or that the processor 48 includes the functionality of the virtual address translator 46.

Moreover, although the present invention is set forth in terms of directly addressable NOR flash RAM as the storage device 12, it is to be appreciated that any other directly addressable storage device 12 may also be employed without departing from the spirit and scope of the present invention. For example, although most storage devices are not directly presently addressable, it may at some point be the case where a hard drive in fact is directly addressable.

CONCLUSION

The present invention may be practiced with regard to updating an application 14 on most any computing device 10, regardless of the relative size of the storage medium 12 thereof. As should now be appreciated, with the present invention as set forth herein, such updating is first simulated before being actually performed, and such actual performance takes place only if the simulation is deemed to have been successful.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method for updating an application 14 such as a file system 16 on a computing device 10, especially one with a relatively small storage device 12. The method ensures that the update will succeed or else does not allow the update to be performed.

The present invention also comprises a new and useful framework for the file system 16 to organize files on the storage device 12 on a per-chunk basis. The framework allows the file system 12 to efficiently use the storage capacity of the storage device 12 without undue waste.

The present invention further comprises a new and useful structure of a file 28 that allows for efficient use of storage capacity of a storage device 12, especially when the file 28 includes null data 40 therein. Such structure allows the file system 12 to efficiently use the storage capacity of the storage device 12 without undue waste based on needless storage of such null data within the file 28.

The present invention still further comprises a method and mechanism by which a file 28 on the storage device 12 of the computing device 10 can be executed almost immediately. The file is stored on the storage device 12 and can be executed directly therefrom, even when the file 12 is stored on the storage device 12 in a fragmented manner.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A computing device including a storage device having contents of a file and a file system for storing and retrieving the contents of the file on the storage device, the file comprising a file header and a plurality of file segments, each of at least some of the file segments being null data and each of at least some of the file segments being substantive data, the file system constructing a segment allocation table, the segment allocation table referenced from the file header, the segment allocation table having an entry for each file segment, wherein the file system stores at least one substantive file segment, wherein the entry in the segment allocation table for the at least one substantive file segment comprises a reference to a location of the at least one substantive file segment, wherein the file system does not store each null file segment, wherein a null data segment of the file represents data removed from the file, wherein the entry in the segment allocation table for each null file segment does not contain a reference to any location, wherein the file system stores the segment allocation table as a plurality of non-contiguous segment allocation table fragments on the storage device, and wherein the file header comprises a plurality of references to locations of the non-contiguous segment allocation table fragments.

2. The computing device of claim 1 wherein the entries in the segment allocation table are ordered according to the order of the segments within the file.

3. The computing device of claim 1 wherein a null data segment of the file represents data not yet placed within the file.

4. A storage device on a computing device, the storage device having contents of a file, the file comprising a file header and a plurality of file segments, each of at least some of the file segments being null data and each of at least some of the file segments being substantive data, the file system constructing a segment allocation table, the segment allocation table referenced from the file header, the segment allocation table having an entry for each file segment, the file system constructing a segment allocation table, the segment allocation table referenced from the file header, the segment allocation table having an entry for each file segment, wherein the file system stores at least one substantive file segment, wherein the entry in the segment allocation table for the at least one substantive file segment comprises a reference to a location of the at least one substantive file segment, wherein the file system does not store each null file segment, wherein a null data segment of the file represents data removed from the file, wherein the entry in the segment allocation table for each null file segment does not contain a reference to any location, wherein the file system stores the segment allocation table as a plurality of non-contiguous segment allocation table fragments on the storage device, and wherein the file header comprises a plurality of references to locations of the non-contiguous segment allocation table fragments.

5. The storage device of claim 4 wherein the entries in the segment allocation table are ordered according to the order of the segments within the file.

6. The storage device of claim 4 wherein a null data segment of the file represents data not yet placed within the file.

* * * * *